United States Patent Office 3,066,097
Patented Nov. 27, 1962

3,066,097
POLYALKYL PYRIDINES FOR CORROSION INHIBITING
Loyd W. Jones, Tulsa, Okla., assignor to Pan American Petroleum Corporation, Tulsa, Okla., a corporation of Delaware
No Drawing. Filed June 9, 1960, Ser. No. 34,856
20 Claims. (Cl. 252—8.55)

This invention relates to inhibiting the corrosion of ferrous metals by water and hydrogen sulfide. More particularly, it relates to an organic composition for inhibiting this type of corrosion.

Many inhibitors are now known for decreasing corrosion due to water and hydrogen sulfide. Among these are the mixtures of polyalkyl pyridines formed by the reaction of ammonia with acetylene or acetaldehyde. The acid-soluble portion of the products of these reactions boiling above about 200° C. is known to be a good hydrogen sulfide corrosion inhibitor. The mixture has the advantage of being a by-product of the manufacture of other compounds such as low-boiling alkyl pyridines or nitriles and, hence, is inexpensive. The amines sometimes are available for as little as 10 cents per pound. In spite of this low cost, and in spite of the amines having been available for several years, they have not been used extensively to inhibit hydrogen sulfide corrosion in oil wells, for example, because of three principal difficulties. These are:

(1) Low solubility in oil and water.
(2) Tendency to emulsify oil and water.
(3) Poor inhibiting action for corrosion by other types of corrosive materials, such as carbon dioxide and low molecular weight organic acids.

These disadvantages can best be considered in connection with inhibiting corrosion of ferrous metals in oil wells. In this case, the low solubility in oil or water makes it difficult to carry the mixed polyalkyl pyridines to the bottom of a well. If the undiluted polyalkyl pyridines are introduced into the annular space between the tubing and casing, they tend to run down the tubing or casing walls, or both, which are thus covered with a thin film. Although the film may be thin, the area is large in a well several thousand feet deep. Therefore, a pint or quart of the polyalkyl pyridines introduced at the top of the annular space may never reach the bottom of a well. The arrival at the bottom of the well will cetrainly be greatly delayed. A form of the inhibitor which can be dissolved in several gallons of the oil or water produced from the well and thus carried to the bottom of the well would obviously be more desirable. In some cases it would even make the difference between the inhibitor being effective or ineffective in inhibiting corrosion at the bottom of the well.

A tendency to form stable emulsions is always a disadvantage of a well-treating material. Emulsion problems are frequently bad enough without being aggravated by an emulsion-forming corrosion inhibitor. A form of inhibitor with decreased tendency to emulsify oil and water is desirable.

Many wells contain not only the corrosive material hydrogen sulfide, but also corrosive materials such as carbon dioxide and low molecular weight water-soluble carboxylic acids, such as acetic and propionic acids, containing from 2 to 4 carbon atoms per molecule. The polyalkyl pyridines alone are ineffective as inhibitors of corrosion by carbon dioxide and propionic acid. A modified form of the low-cost polyalkyl pyridines which extended their applicability to include inhibiting corrosion by a wider class of corrosive materials would be desirable.

While the mixed polyalkyl pyrdines cost very little compared to many other inhibitors of hydrogen sulfide corrosion, an even lower cost modification is always desirable.

One of the manufacturers of mixed polyalkyl pyridines indicates in the sales literature that the material may be absorbed through the skin in harmful amounts and may cause skin and eye burns, but a ten percent solution caused no skin reaction. This is another indication that an inexpensive form of the polyalkyl pyridines, which is soluble in water or oil, is advisable to permit handling the material as a dilute solution. The same manufacturer states that there is little hazard from vapors at low temperatures, but at higher temperatures adequate ventilation should be provided. A combined form or solution of the amines which would reduce the vapor pressure is desirable, not only to decrease the vapor hazard, but to decrease the intensity of the rather disagreeable odor of vapors of the polyalkyl pyridines.

With the above problems in mind, an object of this invention is to provide a modified form of mixed polyalkyl pyridines which retains the hydrogen sulfide corrosion inhibiting ability of the amines, but at the same time improves the quality of the material in at least one of the following ways:

Increasing the solubility in oil or water, decreasing the vapor pressure, decreasing the emulsifying tendency, decreasing the cost, or increasing the effectiveness as an inhibitor for other types of corrosion. A more specific object is to provide a modified form of mixed polyalkyl pyridines which is improved in more than one of the specified ways.

In general, I accomplish the objects of my invention by forming a salt of the mixed polyalkyl pyridines with water-insoluble carboxylic acids containing at least about six carbon atoms for each carboxylic acid radical.

By observing the minimum limitation on the molecular weight of the acid materials, it is possible to replace up to about 50 percent by weight of the amines with the acid while retaining substantially all of the hydrogen sulfide corrosion inhibiting ability of the undiluted amines. The acids, however, do decrease the harmful physiological effects of the amines, both because of a dilution effect and also by reacting with the amines to decrease the vapor pressure of the amines.

At the same time, at least certain of the acid salts have special properties, such as greatly increased oil solubility, decreased emulsifying tendencies, or increased effectiveness as inhibitors for corrosion by materials such as carbon dioxide, propionic acid, or the like which are present in fluids produced from some wells. Unfortunately, however, some of the properties of the salts of the mixed polyalkyl pyridines are not at all predictable. Consideration of salts of three types of acids will illustrate this point. The three types of acids are:

(1) Those produced from partial oxidation of petroleum fractions.
(2) Naphthenic acids.
(3) The non-rosin tall oil acids remaining after removal of the rosin acids.

The non-rosin tall oil acids form salts which are completely soluble in kerosene. The naphthenic acids salts are almost completely soluble in kerosene but require a small amount of alcohol to form a completely clear solution. The salts of the mixed polyalkyl pyridines with the partial oxidation acids, however, are almost completely insoluble in kerosene and require a large amount of alcohol or other solvents or dispersing agents if a solution of the salt in kerosene is to be formed.

Considering the corrosion inhibiting abilities of the various salts, I have found that the salts of the amines with the partial oxidation acids are excellent inhibitors not only for hydrogen sulfide corrosion, but also for corrosion by carbon dioxide and water-soluble carboxylic acids. The salts of the amines with naphthenic acids and non-rosin tall oil acids, on the other hand, are poor inhibitors for types of oil field corrosion other than that caused by hydrogen sulfide.

On emulsion-forming tendencies, the salts of the naphthenic acids are outstanding in their lack of emulsifying tendencies at higher concentrations, such as 10 percent in kerosene. The salts of the amines with the partial oxidation acids and the non-rosin acids from tall oil, however, seem to be even worse emulsion formers than the amine alone when used in concentrations of about 10 percent in oil and other suitable solvents. This is important in the case of squeeze treatments, in which large volumes of solutions containing these rather high concentrations of inhibitor are squeezed back into the formations penetrated by wells so the inhibitor will be produced slowly with the oil production over an extended period of time. Concentrations of only a few parts per million of any of the salts in oil, such as occur in the production from oil wells treated with the inhibitors, have little emulsifying tendencies.

The mixed polyalkyl pyridines may be prepared in a number of ways. Suitable mixtures are now commercially available. One is produced by the vapor phase reaction of acetylene and ammonia to produce nitriles and alkyl pyridines such as, for example, 2-picoline and 4-picoline. After the nitriles have been removed and the low boiling alkyl pyridines have been distilled off, the residue boiling above about 200° C. is a mixture of polyalkyl pyridines suitable for my purposes. This residue is available under the trademark PAP. Another suitable mixture is produced by the reaction of ammonia and acetaldehyde, preferably in the form of the trimeric paraldehyde. This reaction produces principally alkyl pyridines. Again, if the acid-soluble material is distilled to remove the low boiling alkyl pyridines, a residue suitable for my purposes is produced. A material of this type is available under the trademark Alkyl Pyridines HB. Both the reaction of ammonia with acetylene and with acetaldehyde can be varied widely by changing reaction conditions, ratios of raw materials, catalysts, and the like. These changes produce correspondingly wide variations in the composition of the products of the reaction. As far as I have been able to determine, however, all such reactions produce acid-soluble residues boiling in the range of about 200° C. to about 350° C. which are mixtures of polyalkyl pyridines suitable for my purposes. Acid-insoluble materials such as nitriles are produced by the reactions mentioned above. It may be desirable to separate these materials from the alkyl pyridines by acid extraction of the pyridines from the acid-insoluble material. The acid-insoluble chemicals as well as the low-boiling and high-boiling pyridine derivatives do not appear to be objectionable, however, except as dilutents. Therefore, these acid-insoluble substances and other pyridine derivatives may be present, if desired.

The acid portion of the salt should be a carboxylic acid containing at least about 6 or 7 carbon atoms per molecule for the monocarboxylic acids or about twice this number for dibasic acids. Carboxylic acids or low molecular weight, particularly those in the range containing from 2 to 4 carbon atoms, are water-soluble and are themselves corrosive to ferrous metals. The mixed polyalkyl pyridines are not inhibitors for this type of corrosion. Therefore, these low molecular weight acids should be avoided. The salts containing at least about 6 or 7 carbon atoms for each carboxylic acid group are sufficiently water-insoluble to be relatively non-corrosive and are high enough in molecular weight to provide some inhibiting action in combination with the mixed polyalkyl pyridines.

With regard to the upper end of the molecular weight range of the acids, it should be noted that if acids containing more than about 20 carbon atoms per carboxylic acid group are used, some problems of oil-solubility may be encountered. These can be overcome by the use of solvents such as alcohols or dispersing agents such as ethoxylated nonyl phenols. It is in general advisable, however, to use acids containing no more than about 30 carbon atoms for each carboxylic acid group.

The neutral salts of the mixed polyalkyl pyridines with the various carboxylic acid salts ordinarily contain from about 1 to about 4 times as much of the acid product as the mixed amines. This varies with the molecular weight of the acid and with the amount of impurities present in the particular acid product. Tests reported in Example 1 show that up to about 80 percent of the amines can be replaced by the acid product in forming a neutral salt without greatly affecting the hydrogen sulfide corrosion inhibiting ability of the amines. A neutral salt need not, of course, be formed. Neither the acid nor the amine portion of the salt is itself corrosive. Therefore, it will be apparent that a considerable excess of either the amine or acid over that necessary to form the neutral salt may be present.

My invention will be better understood by reference to the following data which for purposes of convenience are presented in the form of examples.

*Example 1*

To determine the hydrogen sulfide corrosion inhibiting ability of the salts, as compared to that of the amine alone, test were carried out as follows: In each test, a 50 ml. portion of kerosene was introduced into a one-liter glass bottle together with a desired amount of inhibitor. The bottle was then cleared of air by introducing oxygen-free nitrogen through a tube into the bottle. Air-free 5 percent sodium chloride brine containing about 600 parts per million of hydrogen sulfide was then poured into the bottle to fill it to the neck while blowing an oxygen-free nitrogen stream into the neck of the bottle. A polished and tared mild steel test panel 1″ x 1″ x 1/16″ was then lowered into the bottle on a glass hook. The glass hook was supported by a stopper for the bottle. The panel or coupon was allowed to remain in the oil layer for 10 seconds before lowering it into the brine. During this period, the oxygen-free nitrogen stream was blown into the neck of the bottle to maintain it in oxygen-free condition. As soon as the coupon was lowered into the brine, the stopper was set in the neck of the bottle and the bottle was allowed to stand at room temperature for five days. At the end of the five-day period, the panel was removed, dipped in dilute inhibited hydrochloric acid solution, rubbed lightly to remove adhering corrosion products, rinsed in distilled water, dipped in alcohol, dried and weighed. Several series of tests were run in accordance with this method. The concentration of hydrogen sulfide in the brine varied somewhat in the series. The period of the tests also varied by a few hours. Therefore, the rate of corrosion was varied to some degree. For this reason, control tests using no inhibitor were run in most cases. Results of the tests are reported in Table I.

*Table I*

| Test No. | Type of inhibitor | Inhibitor conc., p.p.m. | Coupon weight loss, grams | |
|---|---|---|---|---|
| | | | Control | Inhibited |
| 1 | Polyalkyl pyridines alone | 25 | .0207 | .0016 |
| | | | | .0015 |
| 2 | ----do---- | 50 | .0240 | .0006 |
| | | | | .0006 |
| 3 | ----do---- | 100 | .0240 | .0021 |
| | | | | .0005 |
| 4 | Residue acid salt of P.A.P. | 50 | .0240 | .0007 |
| | | | | .0005 |
| 5 | ----do---- | 100 | .0240 | .0007 |
| | | | | .0006 |

*Table I—Continued*

| Test No. | Type of inhibitor | Inhibitor conc., p.p.m. | Coupon weight loss, grams Control | Coupon weight loss, grams Inhibited |
|---|---|---|---|---|
| 6 | Residue acid alone | 25 | .0248 | .0246 .0256 |
| 7 | ____do____ | 50 | .0248 | .0256 .0252 |
| 8 | Partial oxidation acid A salt of P.A.P. in benzene. | 25 | .0248 | .0065 .0072 |
| 9 | ____do____ | 50 | .0248 | .0050 .0073 |
| 10 | Partial oxidation acid A salt of P.A.P. in kerosene-alcohol solution. | 25 | .0298 | .0013 .0016 |
| 11 | Partial oxidation acid A alone in benzene-alcohol solution. | 50 | .0248 | .0227 .0219 |
| 12 | Partial oxidation acid B salt of P.A.P. in kerosene. | 25 | .0208 | .0021 .0026 |
| 13 | ____do____ | 50 | .0208 | .0017 .0020 |
| 14 | Partial oxidation acid B salt of P.A.P. in kerosene-alcohol solution. | 25 | .0208 | .0012 .0010 |
| 15 | ____do____ | 50 | .0208 | .0011 .0010 |
| 16 | Naphthenic acid salt of P.A.P. | 25 | .0208 | .0013 .0010 |
| 17 | ____do____ | 25 | .0207 | .0018 .0014 |
| 18 | Naphthenic acid salt of P.A.P. in water-dispersible form. | 25 | .0207 | .0016 [1].0066 |
| 19 | Non-rosin tall oil acid A salt of P.A.P. | 25 | .0285 | .0018 .0025 |
| 20 | Non-rosin tall oil acid B salt of P.A.P. | 25 | .0285 | .0021 .0021 |

[1] Apparently contaminated with air.

In Table I, the polyalkyl pyridines were manufactured by the reaction of ammonia and acetaldehyde. The term polyalkyl pyridine is abbreviated to P.A.P. in the table. The residue acid tested in Tests 4 to 7 inclusive was produced by the vacuum distillation of the acids produced by the caustic fusion of castor oil for the production of sebacic acid. The partial oxidation acid A used in Test 8 to 11 inclusive was produced by the partial oxidation of a normally liquid petroleum fraction. The partial oxidation acid B used in Tests 12 to 15 inclusive was the product of partial oxidation of a normally solid petroleum fraction. The naphthenic acids used in Tests 16, 17 and 18 were extracted from petroleum. The non-rosin tall oil acids used in Tests 19 and 20 included not only the acids but also some of the rosin oils. The tall oil acids were mostly linoleic, oleic and saturated acids having 16 to 18 carbon atoms per molecule. The acids used in the Tests 19 and 20 differed in having different amounts of rosin oil present and by having a different distribution of the fatty acids.

Tests 1, 2 and 3 show that the polyalkyl pyridines alone are very effective hydrogen sulfide corrosion inhibitors, as reported by the manufacturer. Tests 6, 7 and 11 show the ineffectiveness of high molecular weight carboxylic acids alone in low concentrations as hydrogen sulfide corrosion inhibitors. The other tests show that the salts of these same acids with the polyalkyl pyridines are substantially as effective as the amines in inhibiting hydrogen sulfide corrosion. This means that by replacing some of the amines with high molecular weight organic acids the hydrogen sulfide corrosion inhibiting action of the amines is not harmed and advantage can be taken of the special properties of the salts not available with the amine alone. In all cases the toxicity and vapor pressure of the amines are reduced by dilution and reaction with the acids.

Table I includes some interesting data on the importance of solubility. As will be shown in Example 4, the salts of the partial oxidation acids are even less oil-soluble than the amines alone. A salt of this type in Test 8, for example, permitted about 7 milligrams loss of weight from a test panel. When alcohol was used in Test 10, however, to prepare a more oil-soluble form of this salt, the weight loss was less than 2 milligrams. The same comparison can be made between Tests 12 and 14 and between Tests 13 and 15. In these cases the corrosion rate permitted by the more oil-soluble form of the salt seems to have been only about one half as great as the corrosion rate in the presence of the less oil-soluble form.

Tests 16 and 17 involving naphthenic acid salts of the amines are pertinent to the question of whether the salt should be neutral or not. In Test 16, a neutral salt was formed. That is, the acids and amines used would react with stoichiometrically equivalent amounts of sodium hydroxide and hydrochloric acid, respectively. Obviously, this neutral salt gave very good inhibition. To form the neutral salt, 2½ times as much of the acid product was required as the amines. Thus, more than 70 percent of the amines were replaced with naphthenic acids without loss of corrosion inhibiting effectiveness. In Tests 17 and 18, on the other hand, the salt was prepared using equal weights of the naphthenic acid product and of the amines. While the resulting salt did not appear to be quite as effective as the neutral salt, the comparisons of the results to those reported in Test 1 show the results were about the same as obtainable with the unreacted amine. Test 18 also shows that a water-dispersible form of the inhibitor which was prepared with alcohol and a surface-active agent, as described in my U.S. Patent 2,839,465, is also effective as a hydrogen sulfide corrosion inhibitor. The second of the two duplicate tests in this case shows the effects of oxygen contamination. While the salts give some protection against a combination of oxygen and hydrogen sulfide, better inhibitors are available for this type of corrosion.

It will be noted from Tests 6 and 7 that the residue acids alone provide little, if any, inhibiting action when used in the low concentrations tested. It will also be apparent, however, that the inhibiting action of the salts of the residue acids with the polyalkyl pyridines are as effective as an equal concentration of the amines alone. This is particularly remarkable in this case since, in order to form the neutral salt used in Tests 4 and 5, four times as much of the acid product had to be used as the weight of the amine. This indicates clearly that 80 percent of the amines can be replaced with carboxylic acids which are not themselves effective as inhibitors in the low concentration tested, while retaining the corrosion inhibiting effectiveness of the unreacted amines.

A comparison of the various types of acids used in the tests in Table I should be made. The residue acids are principally dimers of highly unsaturated fatty acids, such as linoleic and linolenic. These dimers also include some acids which contain hydroxyl groups and are thus a more highly oxidized form than the ordinary fatty acids. The partial oxidation acids are also generally characterized by containing more oxygen than that present in the carboxylic acid group. While the residue acids are of quite high molecular weight, the partial oxidation acids, particularly those of type B, were quite low in molecular weight, having an average of only 12 or 13 carbon atoms per molecule and having some acids of much lower molecular weight than this average. While the residue acids, the partial oxidation acids and the non-rosin tall oil acids are all of a predominantly aliphatic nature, the naphthenic acids are cyclic. It will be apparent, therefore, that carboxylic acids of widely varied types are effective for my purposes and all have at least one property in common. They inhibit corrosion by water and hydrogen sulfide.

EXAMPLE 2

To determine the type of amines which can be used to form effective salts for inhibiting hydrogen sulfide corrosion, tests were performed as described in Example 1, except that several different amines were used. In every case the acid product employed to form the salts was a mixture of naphthenic acids extracted from petroleum. Also, in every case a substantially neutral salt was used. The results of the tests are reported in Table II.

Table II

| Test No. | Type of inhibitor | Inhibitor conc., p.p.m. | Coupon weight loss, grams ||
| --- | --- | --- | --- | --- |
| | | | Control | Inhibited |
| 1 | Polyalkyl pyridines A salt | 25 | .0208 | .0013 / .0010 |
| 2 | Polyalkyl pyridines B salt | 25 | .0208 | 1 .0033 / .0018 |
| 3 | Pyridine salt | 25 | .0208 | .0222 / .0224 |
| 4 | Nonyl pyridine salt | 25 | .0208 | .0219 / .0224 |
| 5 | Duomeen-T salt | 25 | .0208 | .0007 / .0004 |

1 Apparently contaminated with air.

Test 1 of Table II is the same as Test 16 of Table I. The polyalkyl pyridines B were produced by the vapor phase reaction of ammonia and acetylene. The Duomeen-T salt used in Test 5 is included simply for purposes of comparison since this is a widely used amine salt commercially available for inhibiting hydrogen sulfide corrosion. The Duomeen-T has the formula $RNH(CH_2)_3NH_2$ in which R is an aliphatic hydrocarbon radical usually containing 16 or 18 carbon atoms. Tests 1 and 2 show clearly that the mixed high-boiling polyalkyl pyridines from whatever source form salts which are effective hydrogen sulfide corrosion inhibitors. Tests 3 and 4 show that the salt of pyridine itself is ineffective as is the high-boiling monoalkyl pyridine used in Test 4. While the results of Tests 1 and 2 are not quite as good as those of Test 5, it should be recalled that the mixed polyalkyl pyridines are available for a cost of only about one fourth that of the amine used in Test 5. It is also true that the salts of the polyalkyl pyridines tested in Table II are not particularly effective in preventing oxygen corrosion or corrosion by carbon dioxide and water-soluble organic acids, while the amine salts used in Test 5 are effective against these other types of corrosion. It will be apparent, however, that where the other types of corrosion are not involved, the inexpensive salts of high-boiling mixed polyalkyl pyridines can be used with advantage.

EXAMPLE 3

In order to test the ability of my inhibitor to mitigate corrosion by low molecular weight organic acids and carbon dioxide, tests were made as follows: About one liter of an aqueous 5 percent brine solution was placed in a two-liter round-bottom flask together with about one liter of kerosene. A reflux condenser was placed over the flask and the system was freed of air by boiling the water while bubbling a stream of oxygen-free carbon dioxide through the liquids for a period of at least two hours. The rate of bubbling was at least 1 cubic foot of carbon dioxide per hour. To the air-free liquids, 500 milligrams of acetic acid were added. This was followed by the inhibitor. A polished, tared mild steel panel 1" x 1" x 1/16" was then suspended in the water phase in the flask on a glass rod passing through a seal in the flask. The flask heater was adjusted to hold the temperature just at the boiling point of water. The concentration of carbon dioxide was maintained by bubbling about 0.2 cubic foot of carbon dioxide per hour through the liquids in the flask during the test. For 15 consecutive seconds out of each minute the panel was raised into the oil phase. A control test was usually run in the same manner at the same time without inhibitor. After twenty-four hours, the panels were cleaned, dried and weighed as described in Example 1. In all cases substantially neutral salts were used. The results of the tests are reported in Table III.

Table III

| Test No. | Type of inhibitor | Inhibitor conc., p.p.m. | Coupon weight loss, grams ||
| --- | --- | --- | --- | --- |
| | | | Control | Inhibited |
| 1 | Polyalkyl pyridines alone | 50 | .1636 | .1918 |
| 2 | ----do---- | 200 | .1736 | .1706 |
| 3 | Partial oxidation acid A salt of P.A.P. | 200 | | .0030 |
| 4 | Partial oxidation acid B salt of P.A.P. | 100 | .1481 | .0081 |
| 5 | ----do---- | 400 | .1788 | .0062 |
| 6 | Naphthenic acid salt of P.A.P. | 100 | .1481 | .1933 |
| 7 | ----do---- | 400 | .1788 | .1821 |
| 8 | Non-rosin tall oil acid A salt of P.A.P. | 50 | .1636 | .1663 |
| 9 | ----do---- | 200 | .1736 | .1453 |
| 10 | Residue acid salt of P.A.P. | 50 | | .1289 |
| 11 | Acetic acid salt of P.A.P. | 200 | | .1749 |
| 12 | Ethyl hexanoic acid salt of P.A.P. | 50 | | .1432 |
| 13 | Oleic acid salt of P.A.P. | 50 | | .1959 |

Tests 1 and 2 show that the mixed polyalkyl pyridines alone are ineffective for inhibiting corrosion by carbon dioxide and water-soluble carboxylic acids, even when the inhibitor is used in concentrations as high as 200 parts per million. In this connection, it should be noted that the concentrations of inhibitor are based on the water content only; that is 200 parts per million is 200 milligrams of the inhibitor in the one-liter of acidified brine. Tests 3, 4 and 5 show that the salts of the mixed polyalkyl-pyridines with the acids obtained from partial oxidation of petroleum fractions are highly effective inhibitors of this type of corrosion. By contrast, the remaining tests show that other organic acid salts of the mixed polyalkyl pyridines are either completely ineffective or almost so. The reason for the unusual effectiveness of the partial oxidation acids is not known. It will be apparent, however, that these salts can be used in wells where carbon dioxide and water-soluble organic acids are present in addition to hydrogen sulfide.

EXAMPLE 4

The solubilities of the various salts of mixed polyalkyl pyridines were tested by mixing 5 milliliters of a salt with 25 milliliters of kerosene. If complete solution did not result, isopropyl alcohol was added to bring the inhibitor into solution in the kerosene. The resulting solution in alcohol and kerosene was then further diluted with kerosene to a volume of 50 milliliters and the condition of the solution was observed. In all cases substantially neutral salts were used. The results of these tests are presented in Table IV.

Table IV

| Test solution, 5 ml. | Mixed with 25 ml. kerosene | Isopropyl alcohol added | Diluted to 50 ml. with kerosene |
| --- | --- | --- | --- |
| Polyalkyl pyridines alone | Partially dispersed. Layer on bottom. | 1 ml. almost clear, 2 ml. dispersed part dissolved. Layer on bottom remained. | Clear on top. About 1 ml. on bottom dissolved by adding 3 additional ml. alcohol. |
| Non-rosin tall oil acid A salt of P.A.P. | Completely soluble | | Clear. |
| Naphthenic acid salt of P.A.P. | Almost completely soluble | 1 ml. clear | Do. |
| Partial oxidation acid B salt of P.A.P. | Very slightly soluble | 1 ml. no change 3 ml. dispersible 20 ml. still not clear. | |
| Do | Mixed with 35 ml. alcohol—clear. | | Slight haze. |

In the first test, it will be noted that the mixed polyalkyl pyridines alone only partially dispersed in kerosene, a portion of the inhibitor forming an undissolved layer on the bottom of the mixing vessel. The addition of a little isopropyl alcohol formed a clear kerosene solution, but the layer of material on the bottom remained undissolved. By use of as much alcohol as amines, it was possible to form a clear solution of the amines in kerosene. This test illustrates the problem of oil solubility presented by the amines alone. The second test in the table shows that these solubility problems can be completely overcome by forming a salt of the mixed polyalkyl pyridines with non-rosin tall oil acids.

A little investigation into the composition of this acid product offered an explanation for the excellent oil-solubility of the salt of the acid product with the amines. These non-rosin tall oil acids contain about 15 or 20 percent of the low-boiling unsaponifiable constituents of tall oil. These unsaponifiables are known to be made up largely of high molecular weight alcohols. These alcohols undoubtedly acted as strong mutual solvents for the amine acid salt and the kerosene. Acid products of this type are obtained as a heads cut in the separation of rosin acids from fatty acids by distillation. The unsaponifiables content of such heads tall oil acid products can vary between about 10 and about 50 percent by weight. The non-rosin tall oil acids B used in Test 20 of Table I contained a higher quantity of unsaponifiables than the non-rosin tall oil acids A used in the test reported in Table IV. The unsaponifiables obtained in the heads cut are obviously lower boiling than oleic acid, one of the principal ingredients of the non-rosin tall oil acids from which the heads are removed, and also one of the principal constituents of the heads cut. Therefore, it can be said that good oil-solubility of the mixed polyalkyl-pyridines can be obtained by forming salts with non-rosin tall oil acids containing from about 10 to about 50 percent by weight of unsaponifiable tall oil constituents boiling at a lower temperature than oleic acid.

The third test shows that the solubility problem can be almost completely overcome by use of the naphthenic acid salts of the amines. Any remaining difficulty with these naphthenic acid salts can be overcome by the use of a small amount of alcohol. The fourth test shows that the salts of the amines with partial oxidation acids present solubility problems even greater than those of the amines alone. It will be apparent from the results reported in the third column of Table IV that use of up to four times as much alcohol as amine still does not result in the formation of a clear solution of this particular salt in kerosene. The fifth test shows that a clear solution of the partial oxidation acid salts can be formed in isopropyl alcohol. When this solution is diluted with kerosene, a slight haze forms. This is not sufficiently serious, however, to prevent mixing the alcohol solution with oil when introducing the inhibitor down a well.

Solubility tests of the residue acid salts tested in Tests 4 and 5 of Table I were not carried out in the quantitative way shown in Table IV. Qualitative tests, however, showed this salt to have an oil-solubility between that of salts of the naphthenic acids and salts of the partial oxidation acids. Again, complete solubility could be obtained by use of isopropanol.

A methanol solution of the partial oxidation acids B salts of the polyalkyl pyridines was also prepared and examined. This solution contained 10 percent by weight of the salts and 90 percent by weight of the methanol. This solution could be easily mixed with brine to form a hazy solution from which a portion of the acid salts settled very slowly. This methanol solution has particular advantages in two treating methods. First, it can be used with advantage in locations where dilution with water or brine rather than oil is desirable. An example of such use in mixing the inhibitor with well fluids containing more water than oil, before introducing the inhibitor into the well.

Second, the methanol solution is particularly applicable to squeeze treatment of wells. In these treatments, a concentrated solution of the inhibitor, usually about 10 percent, is squeezed back into the formations penetrated by a well. The inhibitor is then permitted to flow slowly out of the formation with the well production over a period of several months to provide treatment for metal surfaces exposed to well fluids. Since the methanol solution is not very soluble in oil, and since the solution contains constituents which are not very soluble in water, it will be apparent that the inhibitor will be produced from the formation somewhat more slowly than the predominantly oil solutions used at present for this purpose. It will be recalled that the partial oxidation acid salts are the ones which are effective against corrosion by carbon dioxide and low molecular weight carboxylic acids. Therefore, the methanol solution described above is applicable to the deep so-called condensate or distillate wells found particularly along the Gulf of Mexico. It will be apparent that the concentration of salt in the methanol can vary considerably. Ordinarily not less than about 5 percent of the salt should be present to avoid handling large volumes of the alcohol solution. Not more than about 50 percent of the acid salts should be used if good water dispersibility is to be obtained. In squeeze treatments use of higher concentrations also results in an undesirably rapid production of large volumes of the inhibitor back into the well in the first few days of production. For this reason, the methanol solutions should contain between about 5 and about 50 percent by weight of the partial oxidation acid salts of the mixed polyalkyl pyridines.

The salts of the mixed polyalkyl pyridines with ethyl hexanoic acid were very nearly completely water-soluble. A portion of the salts of the amines with the partial oxidation acids B were also water-soluble, as indicated by a decreased volume of the salt when it was mixed with water and as also indicated by the yellow color of the water. It will be apparent, therefore, that increased water-solubility can be obtained, if desired, by forming salts of the amines with carboxylic acids near the lower limit of about 6 carbon atoms per carboxylic acid group. For such purposes the 350° C. maximum on the boiling point range of the mixed polyalkyl pyridines should be rather strictly observed.

EXAMPLE 5

To determine the emulsion-forming tendency of the mixed polyalkyl pyridines and their salts, the kerosene solutions reported in the last column of Table IV were mixed in various ratios with a 5 percent sodium chloride brine. The mixture was shaken vigorously, allowed to stand for 30 minutes, and observed. The results are reported in Table V. In the table two phases are reported, an oil phase and a brine phase. The inhibitor is, of course, distributed between these phases ordinarily being predominantly in the oil phase.

*Table V*

| Test solution | Volumes, ml. | | Result |
|---|---|---|---|
| | Solution | Brine | |
| 10% polyalkyl pyridines, 86% kerosene and 4% alcohol. | 5 | 45 | 3 ml. oil, 47 ml. cloudy brine. |
| | 15 | 35 | 14 ml. oil, 36 ml. cloudy brine. |
| | 30 | 20 | 29 ml. oil, 21 ml. brine with drops of inhibitor. |
| 10% non-rosin tall oil acid salt of P.A.P. and 90% kerosene. | 5 | 45 | 4 ml. oil, 1 ml. emulsion, 45 ml. clear brine. |
| | 15 | 35 | 50 ml. emulsion. |
| | 30 | 20 | 21 ml. oil, 21 ml. emulsion, 8 ml. clear yellow brine. |
| 10% naphthenic acid salt of P.A.P., 88% kerosene and 2% alcohol. | 5 | 45 | 5 ml. oil, 45 ml. cloudy brine. |
| | 15 | 35 | 15 ml. oil, 35 ml. cloudy brine. |
| | 30 | 20 | 30 ml. oil, 20 ml. clear brine. |
| 10% partial oxidation acid B salt of P.A.P., 70% alcohol and 20% kerosene. | 5 | 45 | 2 ml. oil, 48 ml. cloudy brine. |
| | 15 | 35 | 5 ml. oil, 45 ml. cloudy brine. |
| | 30 | 20 | 9 ml. oil, 1 ml. emulsion, 40 ml. dark amber brine. |

The first test in Table V shows that complete breakout of the inhibitor and oil did not occur in 30 minutes. Obviously, some of the inhibitor and oil remained emulsified in the brine phase. The results of the second test show that the non-rosin tall oil acid salts of the amines are even worse emulsion formers than the amines alone when used in high concentrations. By contrast, when lower concentrations in the range of 50 to 100 parts per million are used, no emulsion-forming tendency at all has been observed. The naphthenic acid salts, by contrast, had practically no emulsifying tendency at all. Some care is necessary in interpreting the results of the final test in Table V. It must be recalled in this case that the test solution contained 70 percent isopropyl alcohol. This water-soluble alcohol could be expected to remain principally in the brine phase. Thus, the small volumes of the oil layers in the three tests are about what would be expected. The emulsifying tendency of the salts of the amines with partial oxidation acids were about the same as with the amine alone. The question mark opposite the results in the final test is because the one milliliter layer between the oil and brine did not seem to be an emulsion as a distinct third phase. This is, of course, possible due to the high concentration of alcohol in this test.

From the results in the tables it will be apparent that the salts of mixed polyalkyl pyridines with high molecular weight organic acids can be used to retain the hydrogen sulfide corrosion inhibiting ability of the amines themselves while at the same time overcoming some of the problems characteristic of these amines. For example, if a very low cost highly oil-soluble hydrogen sulfide inhibitor is required in an area where other types of corrosion are not present, and where there are no great emulsion problems, then the non-rosin tall oil acids should offer a very advantageous solution to the problem. The tall oil acids are even less expensive than the amines. They can sometimes be obtained for less than 2 cents per pound. From the results in Table I, it will be apparent that the salts of the mixed polyalkyl pyridines with these acids are as effective as hydrogen sulfide corrosion inhibitors as the amines themselves.

In areas where emulsion problems may be serious, but where the principal type of corrosion is due to hydrogen sulfide, the naphthenic acid salts may be used to advantage. If any solubility problems arise, they can be solved by the use of a little alcohol.

In areas where carbon dioxide and low molecular weight organic acids are present, either alone or together with hydrogen sulfide, the partial oxidation acid salts of the mixed polyalkyl pyridines can be used. It may be necessary to employ considerable alcohol with the salt to overcome solubility problems and the use of a demulsifier may be necessary to overcome emulsion problems. It will be apparent, however, that in this case the partial oxidation acid salts of the mixed polyalkyl pyridines will solve a problem which cannot be solved by the amines alone.

The various salts can be used in many forms including solutions in oil or alcohol or mixed with other materials, such as dispersing agents and solvents, to improve water dispersibility. The salts can also be mixed with other treating compounds, such as demulsifiers, used for other purposes. The salts can be applied by any of many methods now used for introducing inhibitor into wells, surface gathering systems, pipe lines or petroleum refineries. Still other specific uses and methods of application will occur to those skilled in the art. While concentrations of 25 to several hundred parts per million have been tested in the laboratory for purposes of convenience, it will be apparent that some inhibiting action can be obtained by concentrations much lower than 25 parts per million. In fact, previous correlations between laboratory and field results show that after pretreatments with high concentrations of the inhibitor good results can frequently be obtained by use of as little as two or three parts per million of inhibitor based on the weight of both oil and water present. This is particularly true where the corrosive conditions are much milder than those in the laboratory tests. The minimum concentrations for use in any specific application are best determined by experience.

In general, it can be said that the salts of the mixed polyalkyl pyridines with a carboxylic acid having at least about 6 carbon atoms per molecule can be used to provide the hydrogen sulfide corrosion inhibiting action of the amine itself and at the same time overcome the problems which occur when the amine alone is used. It will be apparent that I can accomplish the objects of my invention by use of such salts of the amines.

I claim:

1. A process for inhibiting corrosion of ferrous metals by a fluid containing water and hydrogen sulfide comprising incorporating into said fluid the salts of a carboxylic acid containing at least about 6 carbon atoms per carboxylic acid radical and mixed amines which are the portion boiling between about 200° C. and about 350° C. of the acid-soluble materials in the reaction product of ammonia with a reactant selected from the group consisting of acetaldehyde and acetylene, said acids being selected from the group consisting of naphthenic acids, acids produced by the partial oxidation of petroleum hydrocarbons, and non-rosin tall oil acids containing from about 10 to about 50 percent by weight of unsaponifiable tall oil constituents, and contacting said metal with the fluid containing said salts.

2. The process of claim 1, in which said amines are the portion boiling between about 200° C. and about 350° C. of the acid-soluble materials in the reaction product of ammonia with acetaldehyde.

3. In the process for inhibiting corrosion of ferrous metals by a fluid containing water and hydrogen sulfide in which an inhibitor is used including mixed amines which are the portion boiling between about 200° C. and about 350° C. of the acid-soluble materials in the reaction product of ammonia with a reactant selected from the group consisting of acetaldehyde and acetylene, and in which the low oil-solubility of said amines is a problem, the improvement comprising introducing said amines into said fluid as the salts of non-rosin tall oil acids containing from about 10 to about 50 percent by weight of unsaponifiable tall oil constituents, and contacting said metal with the fluid containing said salts.

4. In the process for inhibiting corrosion of ferrous metals by a fluid containing water and hydrogen sulfide in which an inhibitor is used including mixed amines which are the portion boiling between about 200° C. and about 350° C. of the acid-soluble materials in the reaction product of ammonia with a reactant selected from the group consisting of acetaldehyde and acetylene, and in which the emulsion-forming tendency of said amines is a problem, the improvement comprising introducing said amines into said fluid as the salts of naphthenic acids containing from about 6 to about 30 carbon atoms per molecule, and contacting said metal with the fluid containing said salts.

5. A process for inhibiting corrosion of ferrous metals by a fluid containing water and a member of the group of corrosive materials selected from the group consisting of hydrogen sulfide, carbon dioxide, carboxylic acids containing from 2 to 4 carbon atoms per molecule and combinations of said materials, comprising introducing into said fluids the salts of acids and amines, said acids being produced by the partial oxidation of petroleum hydrocarbons and containing from about 6 to about 30 carbon atoms per carboxylic acid radical, and said amines being the portion boiling between about 200° C. and about 350° C. of the acid-soluble materials in the reaction product of ammonia with a reactant selected from the group consisting of acetaldehyde and acetylene, and contacting said metal with the fluid containing said salts.

6. The process of claim 5, in which said amines are the portion boiling between about 200° C. and about 350° C. of the acid-soluble materials in the reaction product of ammonia with acetaldehyde.

7. A process of inhibiting the corrosion of metal surfaces in a well exposed to well fluids containing water and hydrogen sulfide comprising squeezing into a formation penetrated by said well a methanol solution containing between about 5 and about 50 percent by weight of the salt of a carboxylic acid containing at least about 6 carbon atoms per carboxylic acid radical and mixed amines which are the portion boiling between about 200° C. and about 350° C. of the acid-soluble materials in the reaction product of ammonia with a reactant selected from the group consisting of acetaldehyde and acetylene, and then producing said well to cause gradual flow of said salt out of said formation past said metal surfaces exposed to said well fluids, said acids being selected from the group consisting of naphthenic acids, acids produced by the partial oxidation of petroleum hydrocarbons, and non-rosin tall oil acids containing from about 10 to about 50 percent by weight of unsaponifiable tall oil constituents.

8. The process of claim 7 in which said amines are the portion boiling between about 200° C. and about 350° C. of the acid-soluble materials in the reaction product of ammonia with acetaldehyde.

9. A process of inhibiting the corrosion of metal surfaces in a well exposed to well fluids containing water and a member of the group of corrosive materials selected from the group consisting of hydrogen sulfide, carbon dioxide, carboxylic acids containing from two to four carbon atoms per molecule and combinations of said materials, comprising squeezing into a formation penetrated by said well a methanol solution containing between about 5 and about 50 percent by weight of the salts of acids and amines, said acids being produced by the partial oxidation of petroleum hydrocarbons and containing from about 6 to about 30 carbon atoms per carboxylic acid radical, and said amines being the portion boiling between about 200° C. and about 350° C. of the acid-soluble materials in the reaction product of ammonia with a reactant selected from the group consisting of acetaldehyde and acetylene.

10. The process of claim 9, in which said amines are the portion boiling between about 200° C. and about 350° C. of the acid-soluble materials in the reaction product of ammonia with acetaldehyde.

11. A composition for inhibiting corrosion of ferrous metals by water and hydrogen sulfide consisting essentially of the salts of carboxylic acid containing at least about 6 carbon atoms per carboxylic acid radical and mixed amines which are the portion boiling between about 200° C. and 350° C. of the acid-soluble materials in the reaction product of ammonia with a reactant selected from the group consisting of acetaldehyde and acetylene, said acids being selected from the group consisting of naphthenic acids, acids produced by the partial oxidation of petroleum hydrocarbons, and non-rosin tall oil acids containing from about 10 to about 50 percent by weight of unsaponifiable tall oil constituents.

12. The corrosion inhibiting composition of claim 11 in which said amines are the portion boiling between about 200° C. and about 350° C. of the acid-soluble materials in the reaction product of ammonia with acetaldehyde.

13. An oil-soluble composition for inhibiting corrosion of ferrous metals by water and hydrogen sulfide consisting essentially of the salts of acids and amines, said acids being non-rosin tall oil acids containing from about 10 to about 50 percent by weight of unsaponifiable tall oil constituents and said amines being the portion boiling between about 200° C. and about 350° C. of the acid-soluble materials in the reaction product of ammonia with a reactant selected from the group consisting of acetaldehyde and acetylene.

14. A composition for inhibiting corrosion of ferrous metals by water and hydrogen sulfide and having little tendency to emulsify oil and water consisting essentially of the salts of acids and amines, said acids being naphthenic acids containing from about 6 to about 30 carbon atoms per molecule, and said amines being the portion boiling between about 200° C. and about 350° C. of the acid-soluble materials in the reaction product of ammonia with a reactant selected from the group consisting of acetaldehyde and acetylene.

15. A composition for inhibiting corrosion of ferrous metals by water and a member of the group of corrosive materials selected from the group consisting of hydrogen sulfide, carbon dioxide, carboxylic acids containing from 2 to 4 carbon atoms per molecule and combinations of said materials, consisting essentially of the salts of acids and amines, said acids being produced by the partial oxidation of petroleum hydrocarbons and containing from about 6 to about 30 carbon atoms per carboxylic acid radical, and said amines being the portion boiling between about 200° C. and about 350° C. of the acid-soluble materials in the reaction product of ammonia with a reactant selected from the group consisting of acetaldehyde and acetylene.

16. The corrosion inhibiting composition of claim 15, in which said amines are the portion boiling between about 200° C. and about 350° C. of the acid-soluble materials in the reaction product of ammonia with acetaldehyde.

17. A composition for inhibiting corrosion of ferrous metals by water and hydrogen sulfide consisting essentially of a methanol solution containing from about 5 to about 50 percent by weight of the salts of a carboxylic acid containing at least about 6 carbon atoms per carboxylic acid radical and mixed amines which are the portion boiling between about 200° C. and about 350° C. of the acid-soluble materials in the reaction product of ammonia with a reactant selected from the group consisting of acetaldehyde and acetylene, said acids being selected from the group consisting of naphthenic acids, acids produced by partial oxidation of petroleum hydrocarbons, and non-rosin tall oil acids containing from about 10 to about 50 percent by weight of unsaponifiable tall oil constituents.

18. The corrosion inhibiting composition of claim 17, in which said amines are the portion boiling between about 200° C. and about 350° C. of the acid-soluble materials in the reaction product of ammonia with acetaldehyde.

19. A composition for inhibiting corrosion of ferrous metals by water and a member of the group of corrosive materials selected from the group consisting of hydrogen sulfide, carbon dioxide, carboxylic acids containing from 2 to 4 carbon atoms per molecule and combinations of said materials, consisting essentially of a methanol solution containing from about 5 to about 50 percent by weight of the salts of acids and amines, said acids being produced by the partial oxidation of petroleum hydrocarbons and containing from about 6 to about 30 carbon atoms per carboxylic acid radical and said amines being the portion boiling between about 200° C. and about 350° C. of the acid-soluble materials in the reaction product of ammonia with a reactant selected from the group consisting of acetaldehyde and acetylene.

20. The corrosion inhibiting composition of claim 19 in which said amines are the portion boiling between about 200° C. and about 350° C. of the acid-soluble materials in the reaction product of ammonia with acetaldehyde.

References Cited in the file of this patent

UNITED STATES PATENTS

| Number | Name | Date |
| --- | --- | --- |
| 2,043,257 | Missbach | June 9, 1936 |
| 2,223,130 | Prutton | Nov. 26, 1940 |
| 2,468,163 | Blair et al. | Apr. 26, 1949 |
| 2,472,400 | Bond | June 7, 1949 |
| 2,588,412 | Rocchini | Mar. 11, 1952 |
| 2,749,348 | Mahan et al. | June 5, 1956 |
| 2,756,211 | Jones | July 24, 1956 |
| 2,818,383 | Jolly | Dec. 31, 1957 |
| 2,955,083 | Levin | Oct. 4, 1960 |
| 2,966,458 | Counts | Dec. 27, 1960 |